United States Patent
Birbaumer et al.

(10) Patent No.: US 11,232,609 B2
(45) Date of Patent: *Jan. 25, 2022

(54) METHOD OF DISPLAYING AN IMAGE ON A SEE-THROUGH DISPLAY

(71) Applicant: ECOLE POLYTECHNIQUE FEDERALE DE LAUSANNE (EPFL), Lausanne (CH)

(72) Inventors: Adrien Birbaumer, Lausanne (CH); Martinus Bosch, Lausanne (CH); Jason Racine, Boncourt (CH); Sabine Süsstrunk, Lausanne (CH)

(73) Assignee: ECOLE POLYTECHNIQUE FEDERALE DE LAUSANNE (EPFL), Lausanne (CH)

(*) Notice: Subject to any disclaimer, the term of this patent is extended or adjusted under 35 U.S.C. 154(b) by 0 days.

This patent is subject to a terminal disclaimer.

(21) Appl. No.: 17/201,773

(22) Filed: Mar. 15, 2021

(65) Prior Publication Data

US 2021/0225045 A1    Jul. 22, 2021

Related U.S. Application Data

(63) Continuation of application No. 16/767,669, filed as application No. PCT/EP2017/083934 on Dec. 20, 2017, now Pat. No. 10,984,563.

(51) Int. Cl.
*G06T 11/00* (2006.01)
*A42B 3/30* (2006.01)
(Continued)

(52) U.S. Cl.
CPC .............. *G06T 11/001* (2013.01); *A42B 3/30* (2013.01); *G02B 27/0172* (2013.01);
(Continued)

(58) Field of Classification Search
CPC ......... G06T 11/001; G06T 11/60; A42B 3/30; A42B 3/32; G02B 27/0172;
(Continued)

(56) References Cited

U.S. PATENT DOCUMENTS

| 8,985,585 | B2* | 3/2015 | Hodge | F41J 5/02 273/348.1 |
| 10,984,563 | B2* | 4/2021 | Birbaumer | G02B 27/0172 |
| 2018/0238993 | A1* | 8/2018 | Send | G01B 11/002 |

* cited by examiner

*Primary Examiner* — Antonio A Caschera
(74) *Attorney, Agent, or Firm* — Stites & Harbison, PLLC; David W. Nagle, Jr.

(57) ABSTRACT

A method of displaying an image on a see-through display comprises: obtaining a first electro-magnetic radiation matrix of radiation intensity values of an object; dividing the first matrix into a second matrix representing a first subset of the radiation intensity values, and a third matrix representing a second subset of the radiation intensity values; generating a first grayscale image with an enhanced contrast representing the first subset of the radiation intensity values from the second matrix; colouring the first grayscale image with a first colourmap to obtain a first colour image; generating a second grayscale image representing the second subset of the radiation intensity values; colouring the second grayscale image with a second colourmap to obtain a second colour image; combining the first colour image and the second colour image; and displaying the combined colour image on the see-through display.

16 Claims, 7 Drawing Sheets

(51) Int. Cl.
*G02B 27/01* (2006.01)
*G06T 11/60* (2006.01)
*G09G 5/02* (2006.01)
*G09G 5/06* (2006.01)

(52) U.S. Cl.
CPC .............. *G06T 11/60* (2013.01); *G09G 5/026* (2013.01); *G09G 5/06* (2013.01); *G02B 2027/014* (2013.01); *G02B 2027/0112* (2013.01); *G02B 2027/0141* (2013.01); *G09G 2320/0666* (2013.01)

(58) Field of Classification Search
CPC ...... G02B 2027/0112; G02B 2027/014; G02B 2027/0141; G09G 5/026; G09G 5/06; G09G 2320/0666; H04N 1/00994; H04N 13/254; H04N 13/332
See application file for complete search history.

METHOD OF DISPLAYING AN IMAGE ON A SEE-THROUGH DISPLAY

CROSS-REFERENCE TO RELATED APPLICATIONS

The present application is a continuation of U.S. patent application Ser. No. 16/767,669 filed on May 28, 2020, which was a national stage application of PCT International Application No. PCT/EP2017/083934 filed on Dec. 20, 2017, the entire disclosures of which are incorporated herein by reference.

TECHNICAL FIELD

The present invention relates to a method of displaying an image, such as a thermal image, on a see-through display. More specifically, the displayed image would otherwise be non-visible for the user of the see-through display. The invention also relates to a corresponding imaging system and to a computer program product for implementing the method.

BACKGROUND OF THE INVENTION

In various fields, it would be useful to show non-visible information, such as thermal information, on a transparent or see-through display, referred to also as an augmented reality display, for a user. This could be particularly useful for example for firefighters, who often encounter difficulties to see through thick smoke. Currently existing hands-free thermal vision systems rarely use superior see-through displays as displaying thermal images on such displays while respecting the way the user perceives them is badly understood. Currently commercially available products can be divided into handheld thermal cameras used for firefighting for example, hands-free thermal vision devices used for firefighting for example, and augmented vision devices used in other fields of applications.

Handheld firefighting thermal cameras use liquid crystal display (LCD) screens to provide a "live" thermal image to the firefighter. Depending on the camera model, the associated thermal image processing ranges from very simple (black and white images with limited image enhancement) to more complex (using multiple image enhancement techniques for increasing contours and details of objects) with multiple colour schemes. However, the image processing and optimisation carried out for standard LCD screens cannot often be used in the context of see-through displays (for example because black and white thermal images are very faintly perceived). As far as hands-free thermal vision devices are concerned, only few commercially available devices exist. These devices are typically based on LCD screens, displayed in a glance mode (i.e. out of central vision). Augmented vision devices for other fields of applications may be used for instance in military (e.g. pilot helmets), medical (augmented reality assisted surgery) and driving (head-up displays) applications and they use similar concepts for displaying information in a partially nonobtrusive manner. However, especially when compared to the needs of thermal imaging or firefighting, the requirements for the image processing are quite different.

An ideal augmented vision system displays non-visible information in such a manner that it only adds information to the already visible information (this is how seamlessness of the system is defined) as opposed to a system which would present a high level of obtrusiveness, preventing the user from accessing important visible information. This goal is similar to various sensor fusion applications, where two (or more) images from different modalities are mixed together in order to maximise the resulting information. However, there are some important distinctions between traditional sensor fusion applications and imaging applications for see-through displays. Firstly, in sensor fusion applications, the user has an unmitigated control over the final image, which is not the case with transparent see-through display applications, where it is only possible to superpose onto the final image as perceived by the user. Secondly, the dynamic range of real world lighting applications is far greater than that of the augmented reality displays, which poses the problem of how to show relevant information in all lighting situations. Thirdly, traditional sensor fusion applications have mostly focused on how to blend images in order to maximise detail perception. However, for example in the firefighting domain, both the detail perception and the temperature perception (understanding the exact temperature of an object) are important.

Thermal image processing has been studied for a wide variety of applications. However, in most if not in all of the cases, the information value has come from either the structure (thermal shapes) or the metric value (temperatures). However, in some fields, such as applications for firefighters, both the structure and metric value are of importance, because firefighters use a thermal camera for dangerous situation assessment. This leads to two major problems: how to compress the thermal image to maximise detail perception while maintaining good temperature perception, and how to colourise the resulting image. Most of the currently known image compression techniques to compress an incoming thermal image to a more reduced range image rely on finding an optimal histogram equalisation technique. However, these techniques are typically applicable to static images only. Furthermore, existing solutions to colourise a thermal image are not suited to firefighting applications, for example. The existing solutions mostly focus on colourising images with natural daytime appearance. Other colour schemes are usually limited to two types: single colour schemes (e.g. black to red colourmaps) and rainbow schemes (high number of colours). The needs for firefighters, for example, are however not covered by these techniques.

SUMMARY OF THE INVENTION

It is an object of the present invention to overcome at least some of the problems identified above related to displaying electromagnetic radiation information on a see-through display.

According to a first aspect of the invention, there is provided a method of displaying an image on a see-through display.

The proposed new solution has the following advantages:
  Good perception of contours of objects and physical elements (such as walls, floor, furniture) to enhance spatial orientation.
  Good perception of temperature of objects (if temperature is of interest) based on an estimate of a level of danger.
  Robustness of the displayed image towards environmental conditions, such as lighting conditions, scene information etc.
  Unobtrusiveness of the displayed image towards the perception of the real world. Possible visual cues are visible at all times and are not blocked by the displayed image.

According to another aspect of the invention, there is provided an imaging system for displaying an image on a see-through display.

Other aspects of the invention are recited in the claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

Figure 1:
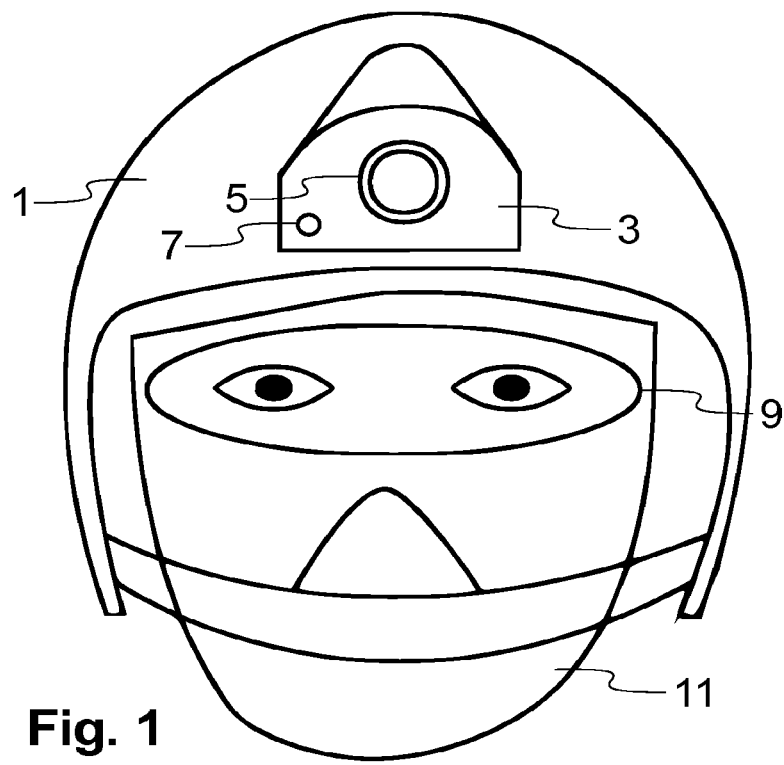
FIG. 1 shows schematically some hardware components, which may be used to implement the proposed method according to an example of the present invention.

An embodiment of the present invention will now be described in detail with reference to the attached figures. This embodiment is described in the context of a firefighting application, but the teachings of the invention are not limited to this environment. For instance, the teachings of the present invention could be used in any other scenario, where thermal information would add information, such as security applications, heavy industry (metallurgy, cement works) applications, specific sports, medical applications etc. Also, the teachings of the present invention are also not specifically tied to thermal imaging, but they could be adapted to other sensors, such as ultraviolet or radar sensors, to show non-visible information in a seamless manner. Identical or corresponding functional and structural elements which appear in the different drawings are assigned the same reference numerals.

The present invention is in the field of augmented vision, a term which may be defined as the enhancement of the human visual system by presentation of non-visible (yet physical) information by using transparent field of view or vision displays, also referred to as augmented or mixed reality (AR/MR) displays. More specifically, the teachings of the present invention are particularly useful in the context of critical and emergency applications, where a quick understanding of information is crucial. The non-visible information considered may be electromagnetic radiation in the infrared spectral range. It typically extends from the nominal red edge of the visible spectrum at 700 nanometres (frequency 430 THz) to 1 millimetre (300 GHz). Thus, the electromagnetic radiation may be thermal radiation and emitted by an object enshrouded in smoke and for this reason normally not visible. However, the teachings of the present invention are also applicable to electromagnetic radiation in other spectral ranges.

The present invention is based on an algorithm, which processes thermal images or electromagnetic radiation images more broadly in order to display them on a see-through display in the best possible way. The "seamlessness" of the displayed image depends on how the non-visible information has been processed to maximise understanding of the mixed (visible+non-visible) image, how the image has been adapted to the use of a transparent display, and how it has been adjusted or calibrated to the current environment. The present invention defines models, algorithms and/or testing procedures needed to achieve the user perception of "seamlessness". The two major parts of this algorithm or process are briefly explained next.

A balance between details and thermal perception through a nested colourmap: The present invention uses two different specifically designed colourmaps to achieve two separate goals. This is believed to be the optimal way of displaying a thermal image with the goal of maximising both detail and temperature perception. This approach could be used on normal displays as well. A colourmap may be defined as a look-up table for matching input grayscale values to colour values. Prior to applying the colourmaps, a specific histogram equalisation technique is used as explained later in more detail. Histogram equalisation is a technique used for adjusting image values to enhance contrast.

Specific adaptation to transparent displays: Due to the presentation of an image directly in the field of view of the user, AR displays tend to maximise the defects of the image stream, and can rapidly become uncomfortable to wear if no extra care has been taken to minimise these defects. The techniques proposed for brightness or luminance adaptation (also display transparency adaptation) tackle the largest perceptual problems of any augmented vision system.

FIG. 1 schematically illustrates the hardware components which may be useful for understanding the teachings of the present invention. A helmet 1, in this example a firefighting helmet, is designed to be worn by a firefighter. A thermal camera component or unit 3 is installed at the front part of the helmet and in this example comprises a thermal camera or sensor 5 and a luminosity sensor 7. The thermal camera 5 is configured to capture one or more electromagnetic radiation frames, in this example thermal image frames or simply thermal frames, of the environment. A thermal frame is understood to be a matrix of temperatures as detected or measured by the thermal camera. A thermal frame may then be visualised as a thermal image so that in this example for each image pixel there is a corresponding temperature matrix value in the temperature matrix. The temperature values of the temperature matrix can thus be simply converted into encoded image pixel values. When multiple frames are taken, then these frames may be shown as a video for the user. In this example, each of the matrix element values is encoded in 14 bits. For this reason, the thermal frame may be called a 14-bit temperature matrix. A modified thermal image as will be explained later may be shown on a display 9, which in this example is a see-through display 9. A see-through display is an electronic display, which allows the user to see what is shown on the (glass) screen while still being able to see through it. The see-through display 9 may have an integrated display brightness control unit or this unit may be provided separately. In FIG. 1, there is also shown a breathing mask 11 for the firefighter. It is to be noted that instead of being mounted on the helmet 1, the thermal camera 5 and/or the luminosity sensor 7 could be mounted on the breathing mask 11 or somewhere else. A data processing or software unit, which is not shown in FIG. 1, is configured to process the thermal frames prior to displaying the modified or processed thermal frames on the see-through display 9. A wireless or wired data communication link is provided between at least some of the following components: the thermal camera component 3, the data processing unit, the brightness control unit and the see-through display 9.

As mentioned earlier, both the details and the temperature perception (understanding the exact temperature of an object) are important for firefighting applications. However, in data visualisation, these are opposing goals, namely quantity reading/identification task (temperature) and form perception (details). To arrive at the present invention, findings of the data visualisation were first validated by carrying out psycho-perceptual experiments in which the observers were given two separate tasks: compare pairs of images in terms of number of details, and estimate the value of a portion of a displayed image. Each of these tasks were repeated multiple times using different colour schemes representing the various possibilities offered by data visualisation. These experiments were performed on a normal computer screen by blending a thermal image and a visual image together to simulate the effect of using a transparent system, and by using a specific AR display model. It was quickly concluded that one "ideal" colourmap was not possible, as multi-colour colourmaps gave better results on the temperature estimation task, while single colour colourmaps worked better on the detail perception as will be explained below in more detail.

Figure 2:
FIG. 2 shows an example grayscale image obtained by a thermal sensor according to an example of the present invention.

According to one example of the present invention, a system and a method are provided for processing and displaying thermal images on a see-through display for firefighting applications. The system is thus configured to carry out the method. The processing of the original thermal frame is in this example divided into three phases as summarised below and explained later in more detail:

1. Automatic gain control: The original thermal frame (input frame or matrix for the processing unit), which can be visualised as an original thermal image as shown in FIG. 2 and captured by the thermal camera 5, is processed in order to lower the input dynamic range to the display output dynamic range. This involves dividing the first temperature matrix, also referred to as the input temperature matrix, into two matrices of the same size: a second or lower temperature matrix containing all the temperatures below a specific threshold and a third or higher temperature matrix containing all the temperatures above or equal to this threshold. The lower temperature matrix is then non-linearly transformed into an image of a lower dynamic range (a lower temperature image), while the higher temperature matrix is linearly transformed into an image of a lower dynamic range (a higher temperature image). By automatic gain control is thus understood a process through which the dynamic range of the input thermal frame or temperature matrix is reduced towards the display dynamic range while maintaining good contrast. Dynamic range may be defined as the ratio of an input or output maximum value to minimum value. The dynamic range of a thermal camera is typically higher than the dynamic range of a display.

2. Colourisation: The lower temperature image is then colourised by using a first colourmap, referred to also as a lower temperature colourmap, while the higher temperature image is then colourised by using a second colourmap, referred to also as a higher temperature colourmap, which in this example is different from the first colourmap (although they could be substantially the same colourmap). These two colourmaps have been designed to achieve separate goals: for the lower temperature image to maximise form perception; and for the higher temperature image to maximise metric data value estimation. The two images are then blended or mixed into one single continuous (in terms of colours) image, thanks to the nested properties of the colourmaps.

3. Automatic brightness control: The colourised mixed image is then displayed on the see-through display 9. For this purpose, the display brightness may be adapted, in this example based on two factors: the estimated information value of the scene (i.e. the original thermal frame), and the current ambient or background light level. Low information scenes lead to a lower display or screen brightness (more transparent perceived image), while maintaining a specific luminosity contrast between the displayed image and the background scene. The automatic brightness control is thus a process through which the display backlight drive or more specifically its value is computed based on the scene's informational value and/or the ambient light level obtained from the luminosity sensor 7.

Figure 3:
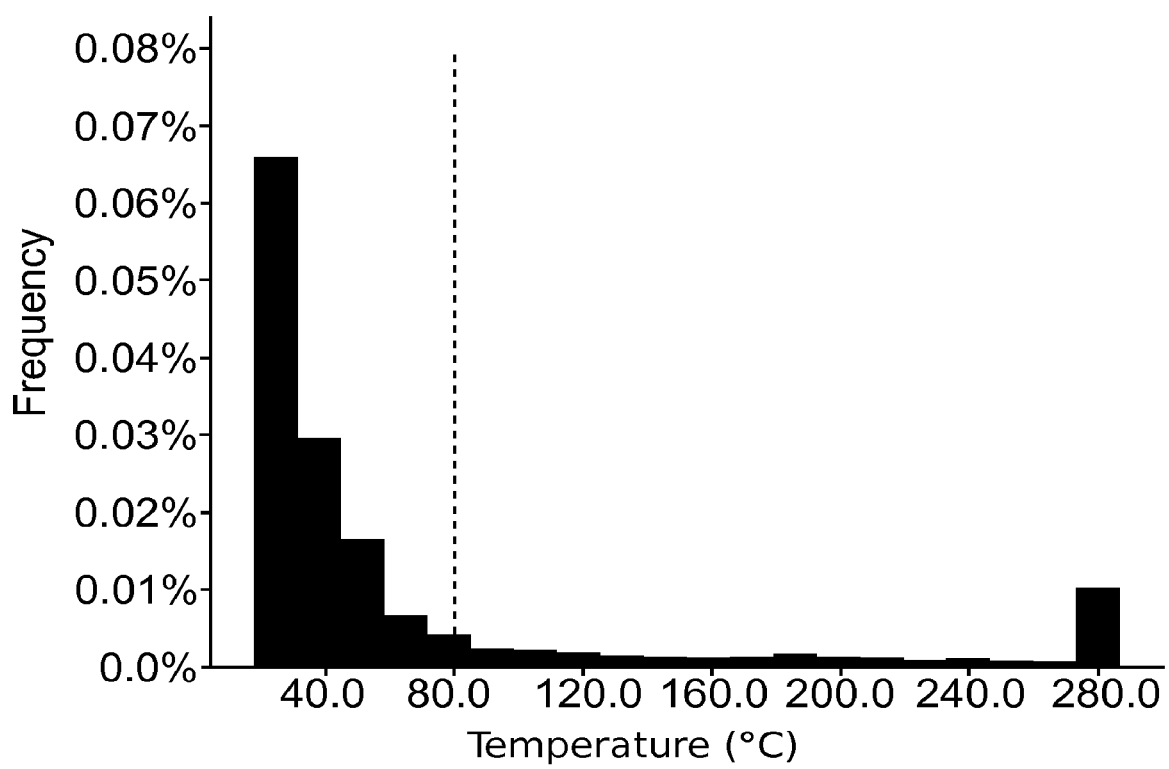
FIG. 3 shows a histogram of the image of FIG. 2 according to an example of the present invention.

The automatic gain control process is next explained in more detail. The process uses a new global histogram equalisation technique (global in the sense that the technique is applied to the whole thermal frame to be processed), which aims to satisfy the two separate goals of thermal image perception (details and temperature). This is achieved by thresholding the input temperature matrix into two separate matrices with the lower temperature matrix representing the lower temperatures, and the higher temperature matrix representing the higher temperatures. FIG. 2 shows the visualisation of the original temperature matrix as the original thermal image while FIG. 3 illustrates the original histogram for that image. The peak at the right end of the histogram is caused by the thermal camera saturation. FIG. 3 also shows the temperature threshold, which in this example is set to 80° C. However, other (fixed) temperature threshold values are equally possible. The temperature threshold may be between 40° C. and 120° C., or between 60° C. and 100° C. or more specifically between 70° C. and 90° C. It is to be noted that that the thermal image of FIG. 2 and the histogram of FIG. 3 are shown merely for illustrative purposes but the proposed method does not in fact use the thermal image of FIG. 2 or the histogram of FIG.

Figure 5:
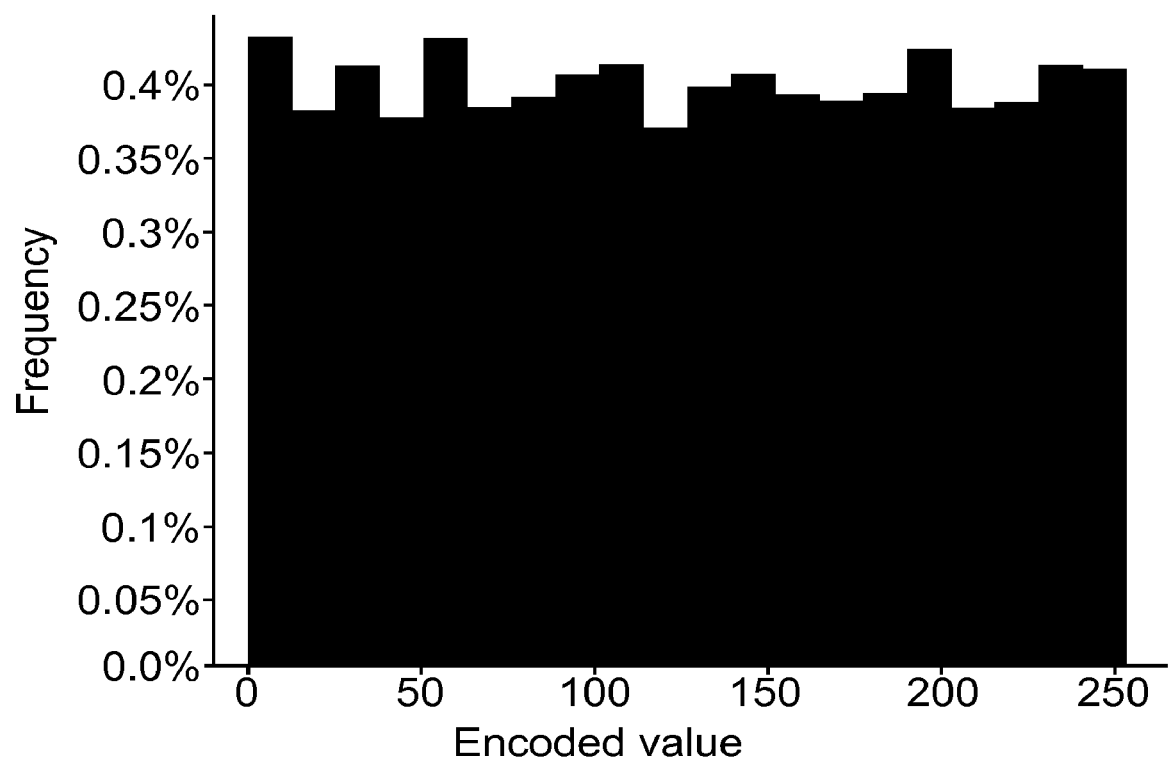
FIG. 5 shows an equalised histogram of the histogram of FIG. 4 according to an example of the present invention.

3 in the computations. Each of the lower and higher temperature matrices is then treated in a different manner. The lower temperature matrix is non-linearly compressed or dilated to increase contrast by using an adapted version of a standard histogram equalisation technique with boundaries put on the compression (or dilation) factor as seen in Algorithm 1 given below. The reason for using this specific histogram equalisation technique is to increase contrast while limiting the number of visual artefacts resulting from a classical histogram equalisation technique (i.e. partial linearity can be maintained by the proposed method). In other words, the resulting histogram is not completely flat, but only approximately flat as shown in FIG. 5. It is to be noted that the histogram shown in FIG. 5 shows fewer than 256 histogram bins and is thus a simplified version of the real histogram. The non-flatness thus means that visual image artefacts can be minimised. In this manner, the lower temperature image part is contrast enhanced through this specific non-linear histogram equalisation technique and mapped to the [0, 255] encoded image element value range. It is to be noted that a histogram equalisation process is by nature a non-linear process.

Figure 4:
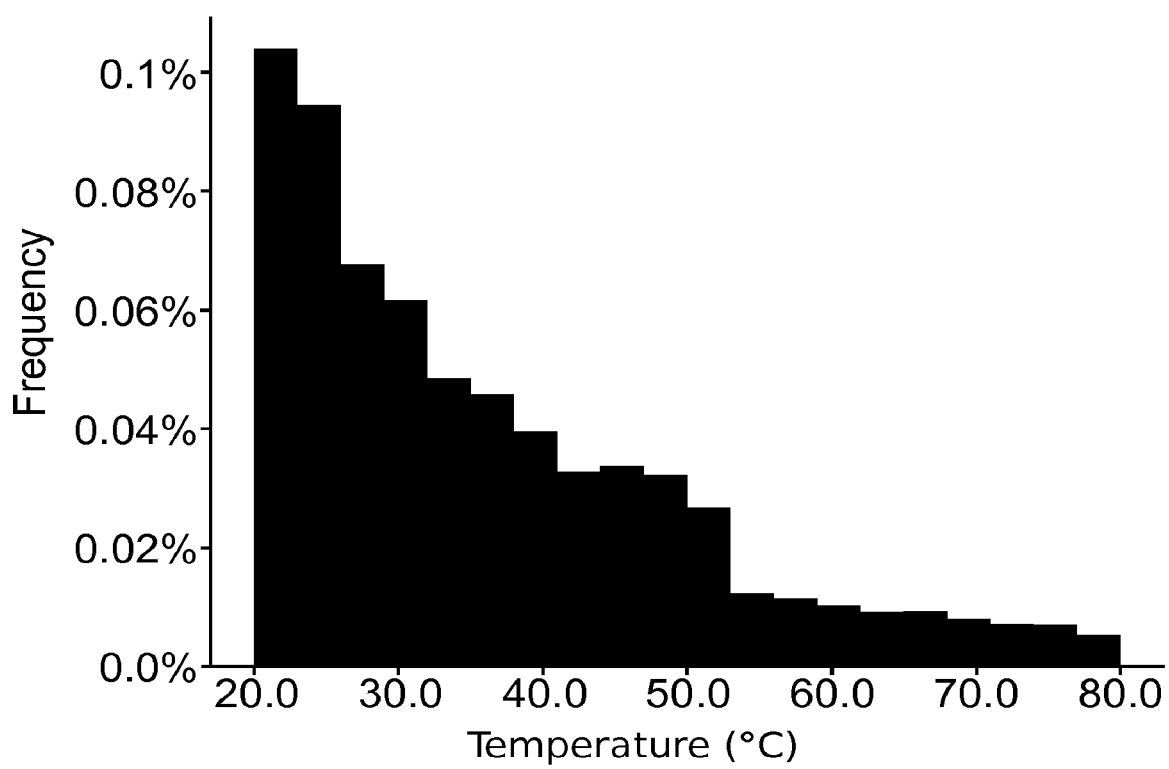
FIG. 4 shows a histogram of a lower temperature image part of FIG. 2 according to an example of the present invention.
Figure 6:
FIG. 6 shows a contrast enhanced lower temperature grayscale image part for the image of FIG. 2 according to an example of the present invention.

The developed histogram equalisation technique used to process the lower temperature matrix functions as follows:

1. All pixels (or image elements more broadly) having a value higher than the temperature threshold are ignored in the future calculations.
2. The total number of pixels is divided by the target histogram bins (256 in this example). This gives the target pixel count per histogram bin $bin_{limit}$. If all the histogram bins contain the same number of pixels, the target histogram is completely flat and thus perfectly equalised. However, in this example, the proposed method does not lead to a perfectly equalised histogram.
3. A histogram as shown in FIG. 4 is obtained for the lower temperature matrix, which is referred to as an input histogram, which can be defined as a vector of number of pixels for each temperature value such that each temperature value of the lower temperature matrix defines an input histogram bin.
4. Each bin of the input histogram is considered, and a new histogram, referred to as an output histogram, is obtained by using a pseudo code described in Algorithm 1 as shown below. It is to be noted that the algorithm considers pixels in one single input histogram bin as a single entity, i.e. they are all allocated to one output histogram bin. Each value $b_{input}$ of the input histogram (i.e. the number of pixels in a particular input histogram bin) is added to the current bin of the output histogram, $b_{output}[ind_{output}]$ indicating the number of pixels in a particular output histogram bin. As long as the number of pixels in the current bin of the output histogram has not reached or surpassed $bin_{limit}$ (first condition), the output index $ind_{output}$ does not change, i.e. the process keeps adding pixels from input bins (bins by bins) to the current bin of the output histogram. It is also verified that the current output histogram bin does not span over a too large range of input histogram bins by comparing the difference of the current input bin index $ind_{input}$ and the last index $ind_{inputlast}$, where the process switched to a "new" output bin, with the compression limit $compression_{limit}$ (second condition). If the difference exceeds the $compression_{limit}$ (expressed as a number of bins), the output bin index is incremented, i.e. the process switches to filling the next output histogram bin. In other words, the process keeps adding pixels to the current bin of the output histogram until whichever of the first and second conditions is fulfilled. Then the process starts filing the next output histogram bin. The $compression_{limit}$ may be between 5 and 100, or 5 and 50 or more specifically between 5 and 20 bins. It is to be noted that the second condition is the novel feature of the present histogram equalisation technique. The output histogram obtained in this manner is thus an equalised version of the input histogram.
5. If the new histogram contains more than 256 bins, the result is linearly remapped to 256 bins (or any other given number of bins). If the output histogram contains at most 256 bins, the histogram is not remapped.
6. A histogram back projection is calculated by remapping each pixel of the lower temperature matrix to the intended value in the [0, 255] range by using the new histogram. This may be done for example by starting from one temperature extreme (e.g. the lowest temperature) of the lower temperature matrix and allocating the encoded value of the first bin of the equalised histogram to the lowest temperature values. If there are still some pixels left in the first bin of the equalised histogram, then the process moves to the second lowest temperature values and allocates the first bin encoded value also to the second lowest temperatures. Once there are no more pixels left in the first bin, the process moves to the second bin and assigns the encoded value of this bin to next available temperature values in the lower temperature matrix. In this manner, all the temperature values of the lower temperature matrix are allocated encoded pixel values in order of increasing temperature values of the matrix. Thus, the back projection of the equalised histogram may be considered to be a re-application of the equalised histogram to the lower temperature matrix functioning as a look-up table for pixel brightness values.
7. This gives the contrast enhanced lower temperature image part as shown in FIG. 6.

Algorithm 1: Custom histogram equalisation technique $ind_{input} = 0$
$ind_{output} = 0$
$ind_{inputlast} = 0$
for all $b_{input}$ do
    $b_{output}[ind_{output}] = b_{output}[ind_{output}] + b_{input}[ind_{input}]$
    if $b_{output}[ind_{output}] \geq bin_{limit}$ then
        $ind_{output} = ind_{output} + 1$
        $ind_{inputlast} = ind_{input}$
    else if $(ind_{input} - ind_{inputlast}) \geq compression_{limit}$ then
        $ind_{output} = ind_{output} + 1$
        $ind_{inputlast} = ind_{input}$
    end if
    $ind_{input} = ind_{input} + 1$
end for As far as the higher temperature matrix is concerned, it is simply linearly scaled or mapped to match the limited range of 256 encoded image element values (or any other given number of encoded values). The following equation defines the linear mapping equation for the higher temperature matrix/image $$pix_{output} = 255 \times (temp_{input} - temp_{threshold}) / (temp_{max} - temp_{threshold}).$$

Figure 7:
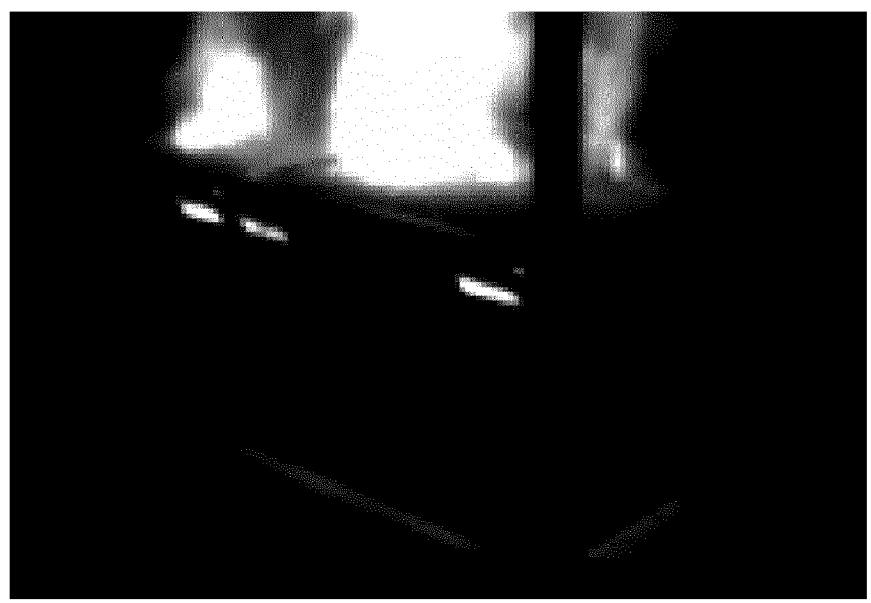
FIG. 7 shows a rescaled higher temperature grayscale image part of the image of FIG. 2 according to an example of the present invention.
Figure 8:
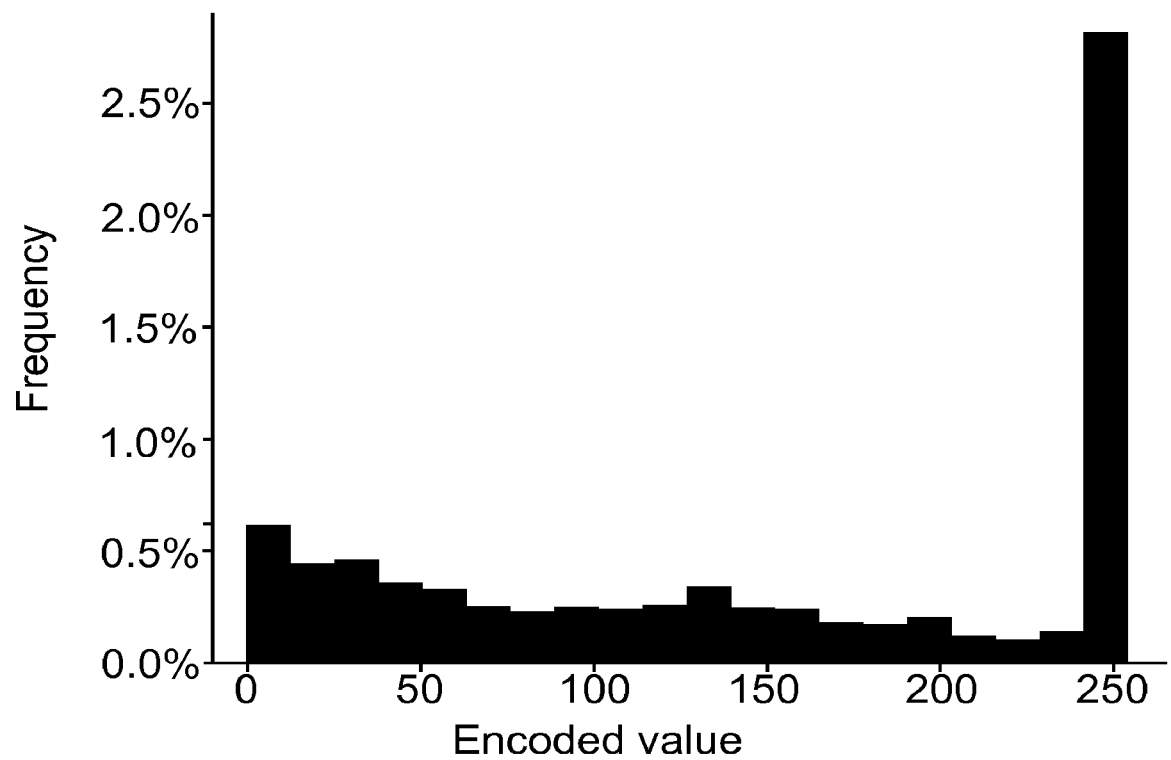
FIG. 8 shows a histogram of the image of FIG. 7 according to an example of the present invention.

Each pixel value $pix_{output}$ or image element value of the rescaled temperature matrix is thus calculated by using the above equation. Each pixel $pix_{output}$ is calculated based on the corresponding input temperature $temp_{input}$ at the same location in the higher temperature matrix. In the above equation, $temp_{threshold}$ is the temperature threshold (80° C. in this case) and $temp_{max}$ is the maximum temperature of the thermal camera 5. The division operation gives a value between 0 and 1, and by multiplying it by 255, the desired range is achieved. The resulting modified or processed higher temperature image part and its histogram are shown in FIGS. 7 and 8, respectively. It is to be noted that, here again, the histogram of FIG. 8 of the image of FIG. 7 is merely shown for illustrative purposes, but the generation of this histogram is optional and it is not used in the proposed method. Furthermore, the histogram shown in FIG. 8 shows fewer than 256 histogram bins and is thus a simplified version of the real histogram.

The colourisation process is explained next in more detail. In this process, the processed lower temperature and higher temperature image parts, which are in this example 8-bit grayscale, black-and-white or monochrome images (i.e. each pixel is encoded in 8 bits), are taken and a colour image, which in this example is a 24-bit image (i.e. each pixel is encoded in 24 bits) is generated. This process of colourising otherwise black-and-white univariate information is called pseudocolouring. Data visualisation theory defines two kinds of pieces of information included in images: metric (or value) which denotes the quantity stored at each point, and form which denotes the shape and structure of the surface.

Figure 9:
FIG. 9 shows a colourised lower temperature image part obtained from the image of FIG. 6.

As mentioned earlier, the first colourmap is used to maximise form perception (details and contours of the scene). In order to do this, the first colourmap is selected as a single colour colourmap comprising values of one colour. The first colourmap is a sequence of colour values, which vary monotonically in lightness and chromaticity. In colour theory, lightness can be considered a representation of variation in the perception of a colour or colour space's brightness. It has a direct relation with relative luminance (same definition as for the luminance but bound to values [0,100]). Chromaticity is the definition of what "colour" a specific pixel or image element is perceived, regardless of its luminance. The first colourmap can be visually shown as a line comprising a given number of connected colour points (in this example 256) each having a different colour value. In this example, the lightness or brightness of the colours in the first colourmap become brighter when moving towards the right end of the first colourmap. In the present example, the colour chosen for the first colourmap is blue, but any other suitable colour could be chosen instead. The first colourmap in this example thus comprises 256 different values of blue for colourising the processed lower temperature image. It is to be noted that in this example, each colour value in the first and second colourmaps is defined by theee colour channel components each defined with 8 bits. The processed lower temperature grayscale image is then colourised with the first colourmap to obtain a colourised and processed lower temperature image. A grayscale version of that image is shown in FIG. 9.

Figure 10:
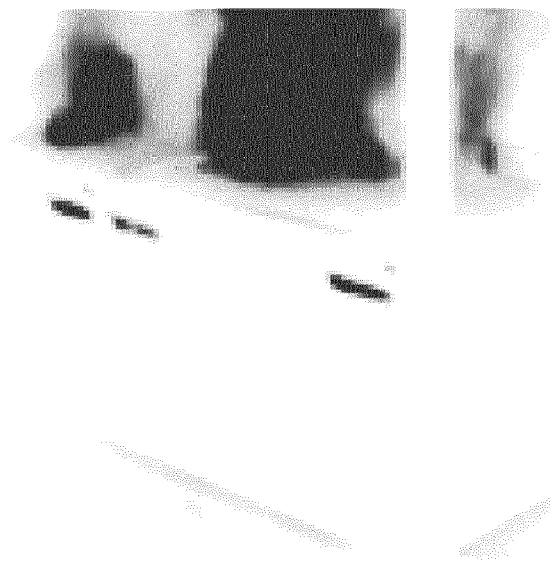
FIG. 10 shows a colourised higher temperature image part obtained from the image of FIG. 7.

The second colourmap is used to maximise metric data value estimation, i.e. the capacity of the user to estimate the value (here temperature) of a specific part of the image. This is implemented by maximising the number of perceptually distinct colour sectors (just-noticeable difference (JND)) in the second colourmap but with all colours sharing similar equal visual importance. It is estimated that in firefighting applications, a ±10° C. approximation is acceptable in a temperature range between 80° C. and 680° C. It corresponds to 60 separate colour sectors. Also the second colourmap can be visually represented by a line comprising a given number of connected colour points (in this example 256) each having a different colour value. The second colourmap is in this example built around 4 distinct main colours and interpolated linearly between these colours, selected in such a way to achieve JNDs >60. These main colours from left to right are in this example white, yellow, orange and red. A grayscale version of a colourised and processed higher temperature image is shown in FIG. 10. This image is obtained by colourising the processed higher temperature grayscale image with the second colourmap.

Figure 11:
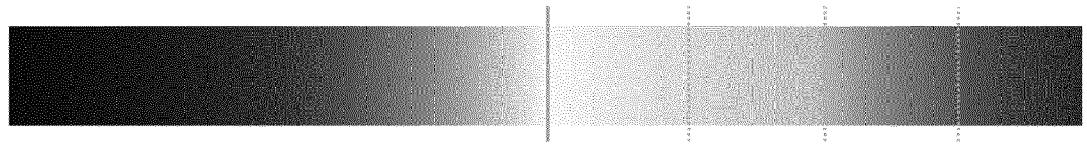
FIG. 11 shows a nested colourmap used to colourise the lower and higher temperature image parts of FIGS. 6 and 7, respectively, according to an example of the present invention.

The first and second colourmaps can be combined to obtain a nested or combined colourmap consisting of the first and second colourmaps as shown in FIG. 11, the first colourmap being the left half of the nested colourmap, while the right half is the second colourmap. In this example, the first and second colourmaps are connected in such a manner that the connecting colour values of the first and second colourmaps have substantially the same chromaticity and lightness values. It is to be noted that it is not necessary to physically connect or combine the first and second colourmaps, but preferably a colour value at one end of the first colourmap has lightness and chromaticity values which are the same as the ones of a colour value at one end of the second colourmap to provide a seamless link between the two colourmaps and thus to avoid artefacts in the image. The first and second colourmaps can be said to be static in the sense that they remain constant for multiple thermal frames, for example for the entire duration of one or more videos consisting of a set of consecutive image frames.

Figure 12:
FIG. 12 shows an alpha mask obtained from the higher temperature image part of FIG. 7 according to an example of the present invention.
Figure 13:
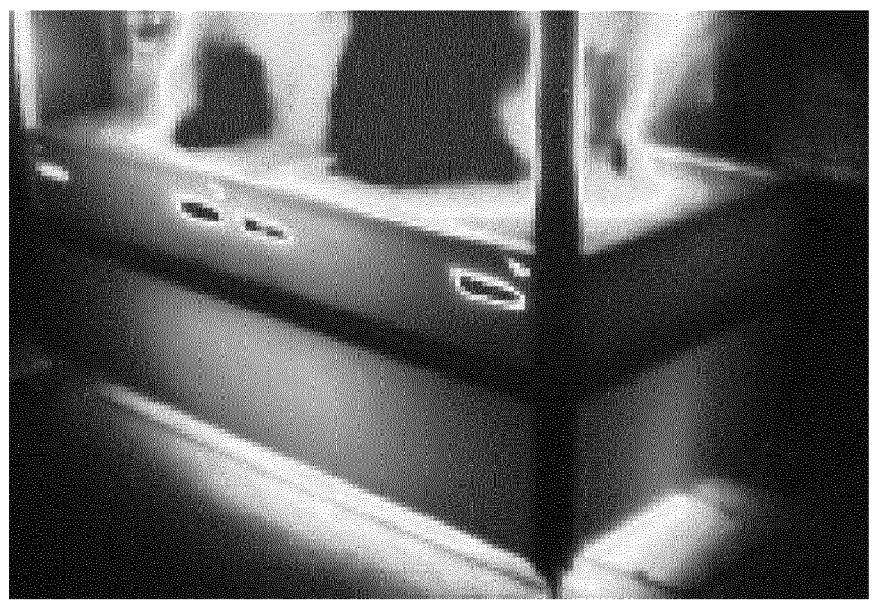
FIG. 13 shows a final colourised blended image obtained from the images of FIGS. 9 and 10.

The two colour images are then combined or blended using an alpha mask shown in FIG. 12. The alpha mask, which is a binary image or matrix of the same size as the original temperature matrix, is derived from the original thermal frame so that the temperature values higher than the threshold temperature are given a first value, while the temperature values smaller than or equal to the threshold temperature are a second, different value. More specifically, the image element or pixel values of the alpha mask are either 0 or 1. In this example, pixel values of the alpha mask are 1 wherever the temperature values in the original thermal frame are above the temperature threshold, which in this example is 80° C. Other pixel values in the alpha mask are set to 0. The alpha mask indicates how the colourised and processed higher temperature image should be superimposed on the colourised and processed lower temperature image. In other words, the values 1 in the alpha mask indicate the pixel locations where the colourised and processed higher temperature image should replace the pixels of the colourised and processed lower temperature image. Instead of replacing pixels, the blended image may be obtained as a completely new image starting from the colourised lower and higher temperature images. FIG. 13 shows a grayscale version of the final blended colour image.

The automatic brightness or luminosity control process is next explained in more detail. The luminosity of the display and its corresponding luminance is adapted to the luminance of the background such that both the visible background and thermal overlay information are understandable. Luminosity is defined as the total light emitted by the full display module, and more specifically the total light emitted by the backlight drive. On the other hand, luminance is defined by how much luminous energy is detected by a human eye when looking at a surface (either the background or the display) at a given angle of view. It defines how bright the surface looks. The display and the background need to keep a fixed luminance ratio if it is desired that the screen always appears "equally" bright. The luminosity or luminance adaptation is implemented by using an integrated or separate backlight in the display 9 and the forward-looking luminosity sensor 7. In order to find the right parameters for their relation, both the display 9 and luminosity sensor 7 are first characterised.

For the display 9, a spectroradiometer is used at various backlight intensities. The goal is to measure the overall display transmissivity, the luminance values of all individual display colours at a fixed backlight level as well as the varying luminance for all possible backlight levels.

The luminosity sensor 7 is either pre-calibrated, or if needed, the characterisation is carried out by using a trusted light source, along with colour filters with known translucent properties. In this manner, the response of the sensor to different colours at different light levels can be established.

In addition to the goal of maintaining a correct ratio of display luminance to scene luminance, the automatic brightness control is optionally also responsible for adapting the luminance of the display depending on the scene's (image's) information value. This value may be determined by the total dynamic range of the original thermal frame. A low dynamic range typically implies a final thermal image with low information value, e.g. when the user is looking directly at a wall having only a very limited temperature range. In these cases, the luminance (or brightness) of the display is adapted in such a way that the display or the displayed image is seen as more transparent. The scene information value is computed to stay within [0:1] range.

If both the scene luminance and the scene information value are considered, then the automatic brightness control is limited by four separate thresholds:

A lower absolute threshold backlight$_{low}$ under which the display backlight drive value is not diminished;

An upper absolute threshold backlight$_{high}$ over which the display backlight drive value is not increased;

a lower ratio threshold ratio$_{low}$, which is a fixed ratio of the display luminance to the scene luminance, and corresponds to low scene information value, which is a value typically slightly higher than 0. The lower ratio threshold ratio$_{low}$ may be chosen empirically and may be a value between 1 and 1.4 or more specifically a value between 1.1 and 1.3, such as 1.2; and an upper ratio threshold ratio$_{high}$, which is a fixed ratio of the display luminance to the scene luminance, and corresponds to normal scene information value, which is a value typically equal to or slightly below 1. The upper luminosity ratio threshold ratio$_{high}$ may be chosen empirically and may be a value between 1.8 and 2.2 or more specifically a value between 1.9 and 2.1, such as 2.

The full automatic brightness control algorithm according to one example is described in Algorithm 2 below. The target luminance ratio lum$_{ratio}$ (the display luminance divided by the scene luminance) is first calculated by multiplying the scene$_{information}$ value with the upper ratio threshold ratio$_{high}$. It is then determined whether or not the obtained value is under the lower ratio threshold ratio$_{low}$, and if it is, then the lum$_{ratio}$ is set it to this threshold value. The screen luminance lum$_{screen}$ is then calculated by multiplying the lum$_{ratio}$ with the measured scene luminance lum$_{scene}$. Now the screen luminance is compared with the two absolute thresholds backlight$_{low}$ and backlight$_{high}$, and set it to one of these boundary values if the screen luminance would otherwise be lower than backlight$_{low}$ or higher than backlight$_{high}$. According to this example, the lum$_{ratio}$ varies depending on the scene information value. In this example, scene information values between the lower and upper thresholds result in linearly increasing display backlight drive values.

---

Algorithm 2: Automatic brightness control technique lum$_{ratio}$ = scene$_{information}$ × ratio$_{high}$
if lum$_{ratio}$ ≤ ratio$_{low}$ then
  lum$_{ratio}$ = ratio$_{low}$
end if
lum$_{screen}$ = lum$_{ratio}$ × lum$_{scene}$
if lum$_{screen}$ ≤ backlight$_{low}$ then
  lum$_{screen}$ = backlight$_{low}$
else if lum$_{screen}$ ≥ backlight$_{high}$ then
  lum$_{screen}$ = backlight$_{high}$
end if

---

Figure 14:
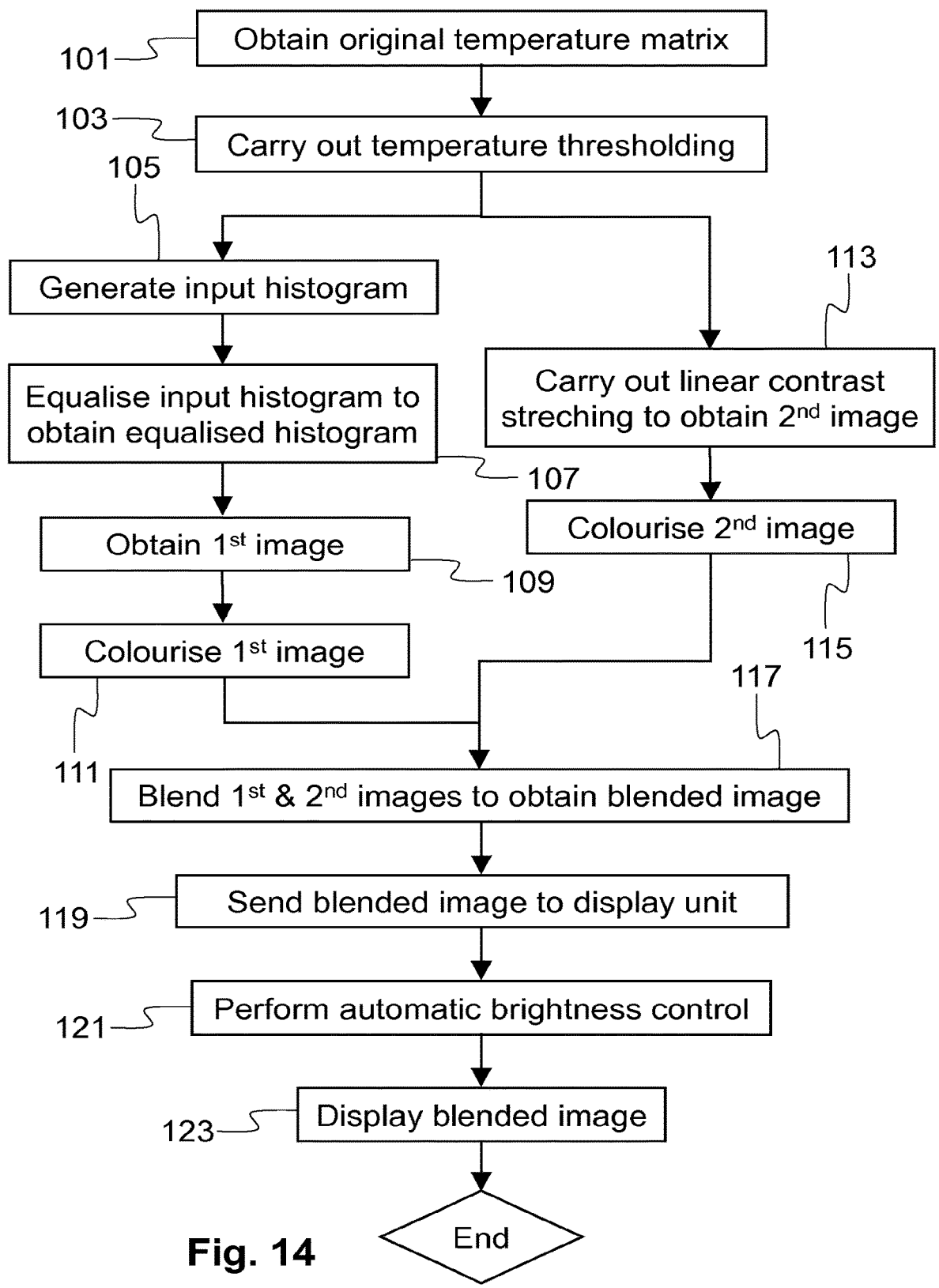
FIG. 14 is a flow chart illustrating the proposed method according to an example of the present invention.

The flow chart of FIG. 14 summarises the proposed method of displaying non-visible information on the see-through display 9. In step 101, the original thermal frame is obtained by using the thermal camera 5. In other words, the original thermal frame is made available by the thermal camera 5 as a temperature matrix with a high dynamic range DR$_H$. In step 103, three matrices of the same size and shape as the original temperature matrix are generated from the original temperature matrix obtained in step 101:

The lower temperature matrix TM$_L$ comprises all the temperature values below or equal to the temperature threshold, the other temperature values are set to 0;

The higher temperature matrix TM$_H$ comprises all the temperature values above the temperature threshold, the other temperature values are set to 0;

The alpha mask, map or matrix TM$_A$ whose matrix values are set to 1 for all the non-zero values of TM$_H$ and 0 for the other matrix element values.

In step 105, the histogram, referred to as the input histogram, for the lower temperature matrix is generated. In step 107, the input histogram is equalised as explained above to obtain the equalised output histogram. In step 109, the contrast enhanced lower temperature grayscale image is generated from the equalised histogram and from the lower temperature matrix TM$_L$. Thus, in steps 105, 107 and 109, the lower temperature matrix TM$_L$ is non-linearly mapped to the lower temperature grayscale image with a short dynamic range DR$_S$ by using the histogram equalisation technique. This process also leads to obtaining a modified lower temperature matrix so that the lower temperature image can be derived from the modified lower temperature matrix. In step 111, the lower temperature grayscale image is colourised by using the first colourmap to obtain the lower temperature colour image C$_L$.

In step 113, the higher temperature matrix TM$_H$ is linearly mapped to the higher temperature grayscale image with a short dynamic range DR$_S$. This involves obtaining a modified higher temperature matrix so that the higher temperature grayscale image can be derived from the modified higher temperature matrix. In step 115, the higher temperature grayscale image is colourised by using the second colourmap to obtain the higher temperature colour image C$_H$.

In step 117, the colour images C$_H$ and C$_L$ are blended using the alpha map TM$_A$ to obtain the combined colour image C$_F$ with the following formula C$_F$=C$_L$ TM$_A$*C$_H$. In step 119, the combined colour image C$_F$ is transmitted either wirelessly or through a cable to the display 9. In step 121, the value of the display backlight drive is determined based on the scene's information value derived from the original input thermal frame and/or luminosity sensor input value. In step 123, the combined colour image C$_F$ is displayed on the see-through display 9 with the display backlight drive set to the value determined in step 121.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For example, instead of using the histogram equalisation technique as explained above, any other process of enhancing contrast could be used to process the lower temperature image part. Thus, any suitable standard histogram equalisation technique could be used instead of the technique described above.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of displaying an image on a see-through display, the method comprising:
    obtaining a first matrix of electromagnetic radiation of an object, the first matrix comprising first matrix elements representing radiation intensity values of corresponding locations of the object;
    dividing the first matrix into a second matrix representing a first subset of the radiation intensity values below or equal to a predefined threshold, and a third matrix representing a second subset of the radiation intensity values above the predefined threshold;
    generating a first grayscale image with an enhanced contrast representing the first subset of the radiation intensity values from the second matrix;
    colouring the first grayscale image with a first colourmap to obtain a first colour image;
    generating a second grayscale image representing the second subset of the radiation intensity values;
    colouring the second grayscale image with a second colourmap, which is different from the first colourmap, to obtain a second colour image;
    combining the first colour image and the second colour image to obtain a combined colour image of the same size and shape as the first colour image or the second colour image; and
    displaying the combined colour image on the see-through display.

2. The method according to claim 1, wherein the step of generating the first grayscale image is achieved via a histogram equalization technique.

3. The method according to claim 1, wherein the step of generating the first grayscale image of the second matrix includes the sub-steps of:
    generating a first histogram for the second matrix;
    equalising the first histogram to obtain an equalised second histogram; and
    using the equalised second histogram to generate the first grayscale image.

4. The method according to claim 3, wherein the first histogram comprises first histogram bins, while the second histogram comprises second histogram bins, and wherein the step of equalising the first histogram comprises allocating image elements of the first histogram bins to the second histogram bins, such that all the image elements of a single first histogram bin are allocated to one second histogram bin, and such that filling a particular second histogram bin with the image elements of the first histogram bins is stopped when at least one of the following events happens:
    a number of image elements in the particular second histogram bin reaches a threshold value; and
    a number of different first histogram bins used to fill the particular second histogram bin reaches another threshold value.

5. The method according to claim 1, wherein the step of generating the second grayscale image representing the second subset of the radiation intensity values is achieved by linearly mapping the second subset of the radiation intensity values to a given number of encoded radiation intensity values.

6. The method according to claim 5, wherein the first colourmap and the second colourmap define a first colour look-up table and a second colour look-up table, respectively, such that the first and second colour look-up tables each comprise n distinct colour values, where n equals the given number of encoded radiation intensity values.

7. The method according to claim 6, wherein the n distinct colour values of the second colourmap are each individually distinguishable for a human eye.

8. The method according to claim 1, wherein the electromagnetic radiation is thermal radiation.

9. The method according to claim 1, wherein the first colourmap comprises colour values whose lightness and chromaticity values increase from a first end of the first colourmap to a second end of the first colourmap.

10. The method according to claim 1, wherein the first colourmap is a single colour colourmap, and wherein the second colourmap is a multi-colour colourmap.

11. The method according to claim 1, wherein the method further comprises generating a binary fourth matrix of the same size and shape as the first matrix, wherein the binary fourth matrix comprises fourth matrix elements which are set to 1 for every non-zero value of the third matrix and the other fourth matrix elements are set to 0, or vice versa, and using the binary fourth matrix to combine the first colour image and the second colour image.

12. The method according to claim 1, wherein the method further comprises adapting a display luminance based on object background luminance.

13. The method according to claim 12, wherein the method further comprises determining the object background luminance and maintaining a predetermined ratio of the display luminance to the object background luminance.

14. The method according to claim 12, wherein the method further comprises determining the object background luminance and varying a ratio of the display luminance to the object background luminance between a lower threshold and a higher threshold depending on an information value of the first matrix, where the lower threshold corresponds to a low information value, while the higher threshold corresponds to a normal information value.

15. An imaging system for displaying an image on a see-through display, the imaging system comprising means for:
    obtaining a first matrix of electromagnetic radiation of an object, the first matrix comprising first matrix elements representing radiation intensity values of corresponding locations of the object;
    dividing the first matrix into a second matrix representing a first subset of the radiation intensity values below or equal to a predefined threshold, and a third matrix representing a second subset of the radiation intensity values above the predefined threshold;

generating a first grayscale image with an enhanced contrast representing the first subset of the radiation intensity values from the second matrix;

colouring the first grayscale image with a first colourmap to obtain a first colour image;

generating a second grayscale image representing the second subset of the radiation intensity values;

colouring the second grayscale image with a second colourmap, which is different from the first colourmap, to obtain a second colour image;

combining the first colour image and the second colour image to obtain a combined colour image of the same size and shape as the first colour image or the second colour image; and displaying the combined colour image on the see-through display.

16. A system for obtaining and displaying an image, comprising:

a protective helmet configured to be worn by a user;

a thermal sensor installed on a front part of the protective helmet and configured to capture a first matrix of radiation intensity values;

a see-through display mounted to the protective helmet and arranged in a field of view of the user;

a data processing unit configured to:

divide the first matrix into a second matrix representing a first subset of the radiation intensity values below or equal to a predefined threshold, and a third matrix representing a second subset of the radiation intensity values above the predefined threshold, generate a first grayscale image with an enhanced contrast representing the first subset of the radiation intensity values from the second matrix, colour the first grayscale image with a first colourmap to obtain a first colour image, generate a second grayscale image representing the second subset of the radiation intensity values, colour the second grayscale image with a second colourmap, which is different from the first colourmap, to obtain a second colour image, combine the first colour image and the second colour image to obtain a combined colour image of the same size and shape as the first colour image or the second colour image, and display the combined colour image on the see-through display.

* * * * *